United States Patent [19]
Landis

[11] Patent Number: 4,507,900
[45] Date of Patent: Apr. 2, 1985

[54] ELECTRICAL DISTRIBUTION FOR METAL DECK CONSTRUCTION

[75] Inventor: Donald H. Landis, Pittsburgh, Pa.

[73] Assignee: Epic Metals Corporation, Rankin, Pa.

[21] Appl. No.: 468,492

[22] Filed: Feb. 22, 1983

[51] Int. Cl.³ .............................................. E04B 5/48
[52] U.S. Cl. ....................................... 52/221; 174/48
[58] Field of Search .................... 52/221; 220/3.3, 3.4, 220/3.5; 174/48, 49

[56] References Cited

U.S. PATENT DOCUMENTS

| 3,426,492 | 2/1969 | Fork | 52/221 |
|---|---|---|---|
| 3,426,802 | 2/1969 | Fork | 138/92 |
| 3,459,875 | 8/1969 | Fork | 174/97 |
| 3,701,837 | 10/1972 | Fork | 174/50 |
| 3,721,051 | 3/1973 | Fork | 52/173 |
| 3,886,702 | 6/1975 | Fork | 52/221 |
| 3,903,666 | 9/1975 | Fork | 52/221 |
| 3,932,696 | 1/1976 | Fork et al. | 174/48 |
| 4,178,469 | 12/1979 | Fork | 52/221 X |
| 4,232,493 | 11/1980 | Gray et al. | 52/221 |
| 4,338,484 | 7/1982 | Littrell | 174/48 |
| 4,454,692 | 6/1984 | Ault | 52/221 |

Primary Examiner—Carl D. Friedman
Attorney, Agent, or Firm—Arnold B. Silverman

[57] ABSTRACT

A metal raceway structure has a metal ribbed deck cooperating with an underlying member to define a plurality of cells each adapted to carry electrical utility wires. A housing member is positioned in cooperation with the deck in such fashion that openings in the deck members will permit access to the wires in the various cells. The housing has a chamber, at least one housing electrical receptacle has a pair of electrical sockets and has a mouth disposed at the upper end thereof. At least one remote electrical receptacle has a pair of electrical sockets and is disposed above the housing chamber, has an electrical wire in electrical contact therewith and has a plug engaged within a housing electrical receptacle. The remote electrical receptacle or receptacles may be secured to a face plate which is generally horizontally oriented so as to be generally flush with an overlying floor member or may be secured to vertically oriented face plates so as to provide a tombstone construction. The housing member may have one or more housing extensions within which the housing receptacles are positioned.

25 Claims, 14 Drawing Figures

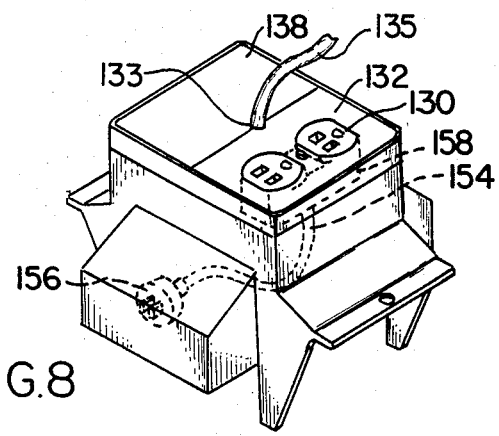
FIG. 8
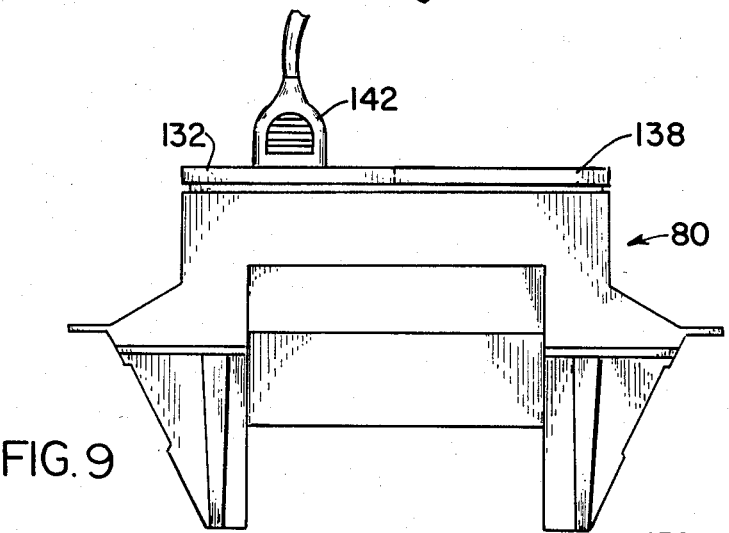
FIG. 9
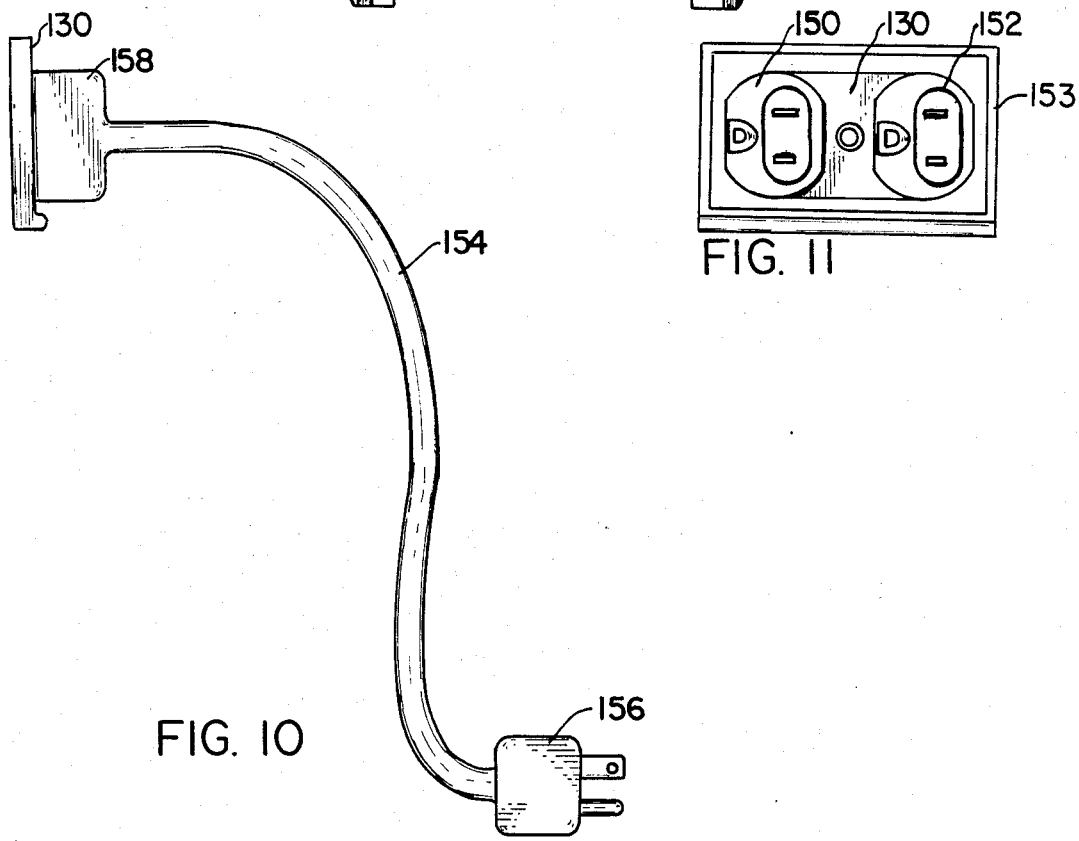
FIG. 10
FIG. 11

ELECTRICAL DISTRIBUTION FOR METAL DECK CONSTRUCTION

FIELD OF THE INVENTION

This invention relates to an electrical system for use with metal raceway constructions adapted to deliver up to three types of utilities to a single location and, more specifically, it provides means for positioning and energizing electrical receptacles at various locations for the convenience of the user.

DESCRIPTION OF THE PRIOR ART

The advantageous use of formed metal deck in combination with concrete in establishing floors and roofs for buildings and the like has long been known. In general, in such constructions an elongated metal deck member are provided with alternating ribs and valleys. The deck members are connected to associated deck members and are supported by suitable structural beams and the like. A layer of overlying concrete is poured onto the deck. When the concrete hardens, a composite action is created wherein the resultant structure has excellent tensile strength as a result of the metal deck and excellent compressive strength as a result of the presence of concrete.

It has been known in such constructions to provide a sheet underlying the rib deck in order to define a series of elongated cells or raceways permitting passage of electrical wires for various utilities through the cells.

It has been known to provide various systems wherein openings are made in the deck ribs so as to permit access to the wires contained within the cells. U.S. Pat. Nos. 3,426,492; 3,426,802; 3,459,875; 3,701,837; 3,721,051; and 3,886,702.

It has also been previously suggested to provide members which are positioned adjacent to the rib openings and cooperate therewith so as to facilitate access to the wiring contained within the cells and distribution of electricity. See, generally, U.S. Pat. Nos. 3,903,666; 3,932,696; 4,232,493; 3,417,191; and 4,338,484. See also, copending application U.S. Ser. No. 316,682, filed Oct. 30, 1982 and entitled "Metal Deck Raceway Construction", now U.S. Pat. No. 4,454,692 the disclosure of which is hereby expressly incorporated by reference.

In general with the prior systems, electrical devices which were to be in communication with the electrical wires contained within the cells through housings or other structural members disposed on the deck had one of three positions depending upon the specific nature of the use and the preference of the one occupying the building area. In some instances, the only access provided was through inserting an electrical plug into an electrical receptacle contained within the housing. In others, the outlet openings were facing generally upwardly with the receptacles positioned generally flush with the floor. In yet others a structure projecting upwardly beyond floor level for approximately three to four inches provided receptacle outlets which were opened generally in a horizontal direction. This last construction is frequently referred to as the "tombstone". One of the problems which has resulted from such systems is the need to supply to the job site precise numbers of each of the different types of housings, hardware and electrical outlets depending upon the numbers of each category of connection desired.

There remains, therefore, a very real and substantial need for a system which will permit use of the type of outlet desired at the particular location within a building in a simplified fashion while eliminating the need for various types of hardware.

SUMMARY OF THE INVENTION

The present invention has met the above-described need by providing a simple, efficient and economical means for permitting the use of identical component for the housing, with minor hardware changes, depending upon the level on which an electrical receptacle is to be positioned.

In a preferred embodiment of the present invention a metal raceway structure will be provided with a metal deck having alternating ribs and valleys, an underlying sheet-like member to define a plurality of cells and electrical wires in the cells. A housing is positioned in communication with three such cells. The housing has an interior chamber, a mouth disposed generally at the upper end thereof and one or more housing electrical receptacles. The housing electrical receptacles may advantageously be positioned within extensions of the housing and have socket openings in communication with the housing chamber.

One or two remote electrical receptacles are provided and are secured to face plates. Electrical wire means are connected to the remote receptacle and have a plug at the other end which is adapted to engage the socket of the housing receptacle. In one embodiment where positioning of the electrical outlets at or adjacent floor level is desired, the face plates may be positioned in overlying relationship with respect to the housing mouth and may be generally horizontally oriented. In another embodiment where a tombstone-like construction is desired, the face plates may be in spaced generally vertically oriented position with their socket openings facing in opposed directions with a cover member cooperating with the face plates so as to define an enclosure in communication with the housing chamber. The electrical wire means are of sufficient length so as to extend beyond the housing mouth while maintaining electrical contact through the plug being inserted into the housing receptacle.

It is an object of the present invention to provide a modular concept for positioning and energizing of electrical outlets employed in connection with metal deck-concrete raceway construction.

It is a further object of the present invention to provide such a system which is compatible with existing metal deck-raceway construction and is simple and economical to adopt and use.

It is a further of the present invention to provide such a system which reduces the number of parts which must be supplied in order to permit optional positioning of electrical outlets in various positions, such as within a housing, at floor level or within a tombstone projecting above floor level.

These and other objects of the invention will be more fully understood from the following description of the invention on reference to the illustrations appended hereto.

BRIEF DESCRIPTION OF THE DRAWINGS

FIG. 8 is an isometric view of the form of housing illustrated in FIG. 7.

FIG. 9 is a side elevational view of the form housing shown in FIGS. 7 and 8.

FIG. 10 is an illustration of a form of electrical wire means and associated remote electrical receptacle.

FIG. 11 is a front elevational view of the receptacle shown in FIG. 10.

DESCRIPTION OF THE PREFERRED EMBODIMENT

Figure 1:
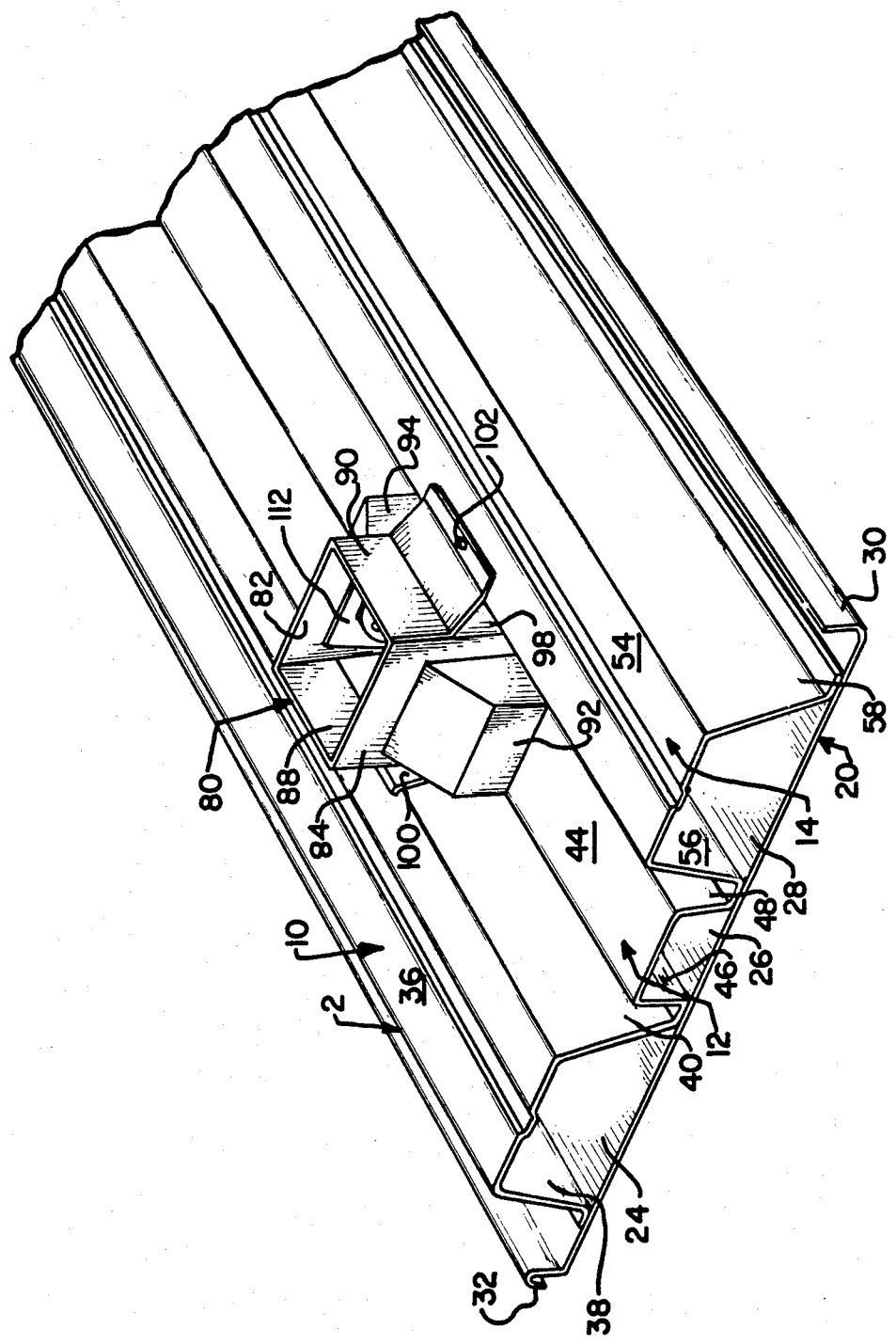
FIG. 1 is a fragmentary, partially schematic isometric view of one form of metal raceway structure of the present invention.

Referring more specifically to FIG. 1 there is shown a metal deck 2 which, in the form shown, has a first rib 10, a second rib 14 of substantially identical in height as the first rib 10 and an interposed third rib 12 of lesser height than the ribs 10, 14. In the form illustrated in FIG. 1, the ribs 10, 14 are formed from a unitary piece of metal sheet. Underlying the metal deck 2 is a generally planar sheet member 20 which cooperates with the metal deck 2 to define a series of raceways or cells 24, 26, 28. In the form shown in FIG. 1, portions of the metal deck 2 between ribs 10, 14 are in overlying contact with the sheet 20 to provide separate cells 24, 26, 28. At opposed lateral edges of the sheet 20 are an upstanding tongue 30 and a downwardly open channel 32 which are adapted to be engaged in tongue-and-groove relationship deck panels or raceway forming-panels such panel 20.

As a result of using the three, independent cells 24, 26, 28 it would be appreciated that utility delivery means, such as electrical wires, may be separated according their function. For example, electrical high tension or power wires may be supplied through one cell, low tension telephone wires may be run through a second cell and other electrical needs such as signal wires for a computers and the like could be run through a third cell. It will be appreciated that one or more wires of a given type may be provided within a single cell or, if desired, for a particular installation different types may be commingled.

Referring still to FIG. 1, it will be seen that the rib 10 has a top wall 36 and a pair of substantially straight angularly dependent side walls 38, 40. Similarly, rib 14, which preferably has a cross-sectional area generally identical to that of rib 10 has top wall 54 and substantially straight angularly oriented depending side walls 56, 58. Rib 12 which, if desired, may be provided as a separate member and cooperate with a flat deck section connecting ribs 10 and 14, has a generally rectangular cross-sectional configuration, as distinguished from the frustoconical configurations of ribs 10, 14. Rib 12 has a top wall 44 in side walls 46, 48. Rib 12 has a cross-sectional area, in the form shown which is substantially smaller than the area of the interior of rib 10 or rib 14. Top wall 44 of rib 12 is shown disposed at a level below the level of top walls 36, 54.

Figure 2:
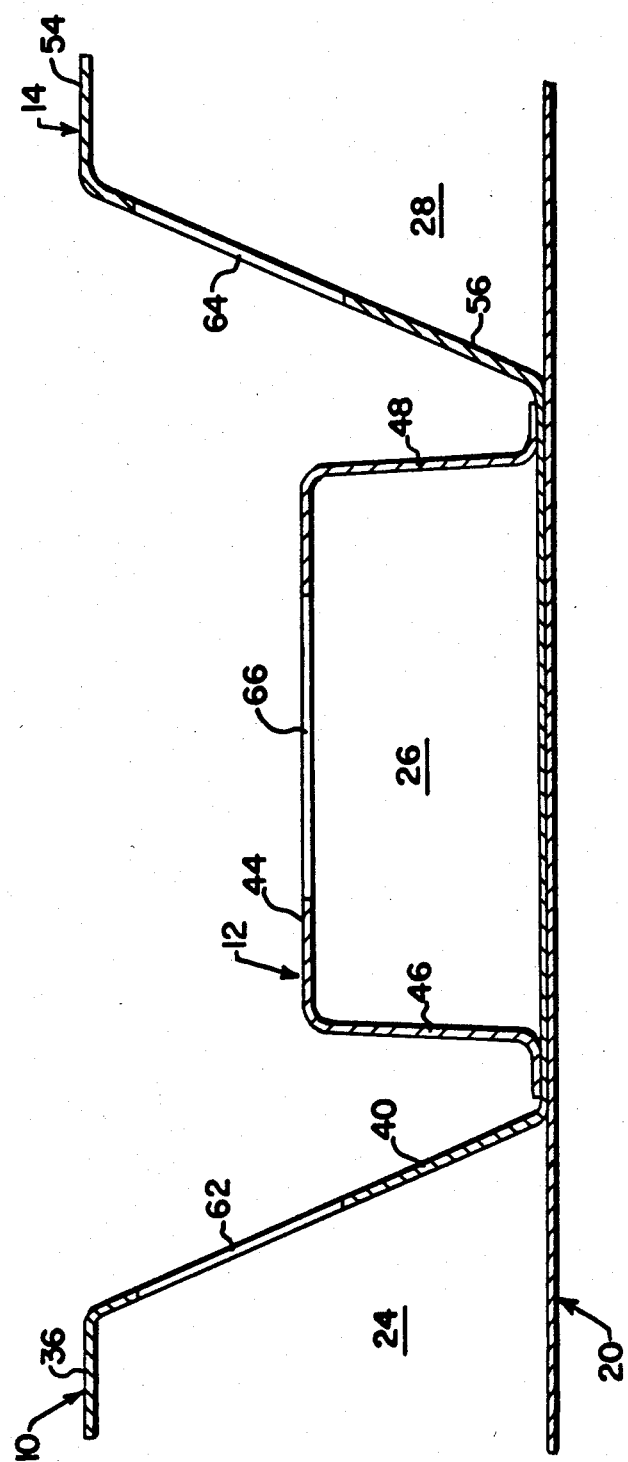
FIG. 2 is a fragmentary cross-sectional illustration of a form of raceway construction which may be employed in connection with the present invention.
Figure 3:
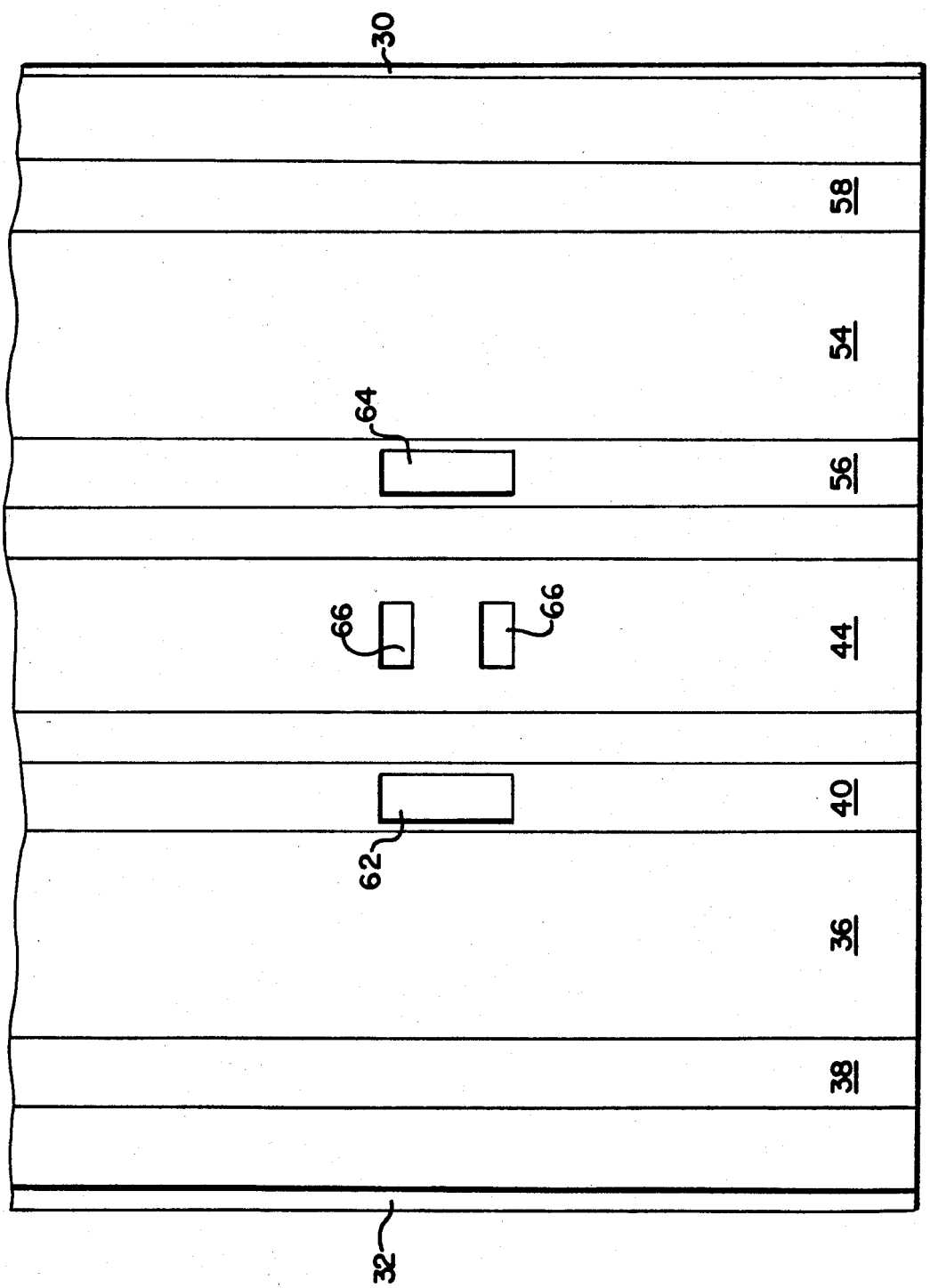
FIG. 3 is a fragmentary top plan view of a section of deck which may be used in connection with the present invention.
Figure 4:
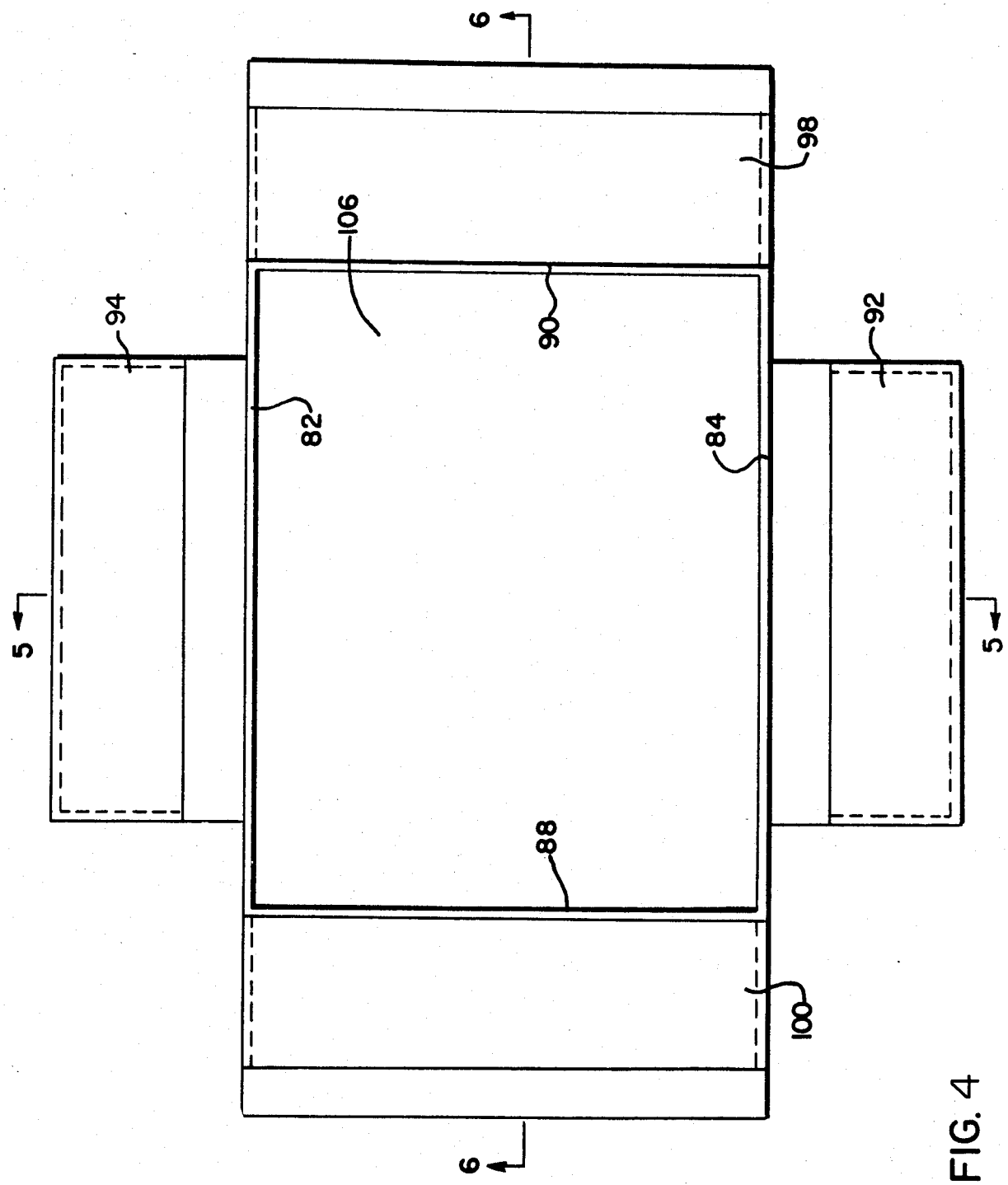
FIG. 4 is a top plan view of a form of housing adapted for use in the present invention.
Figure 5:
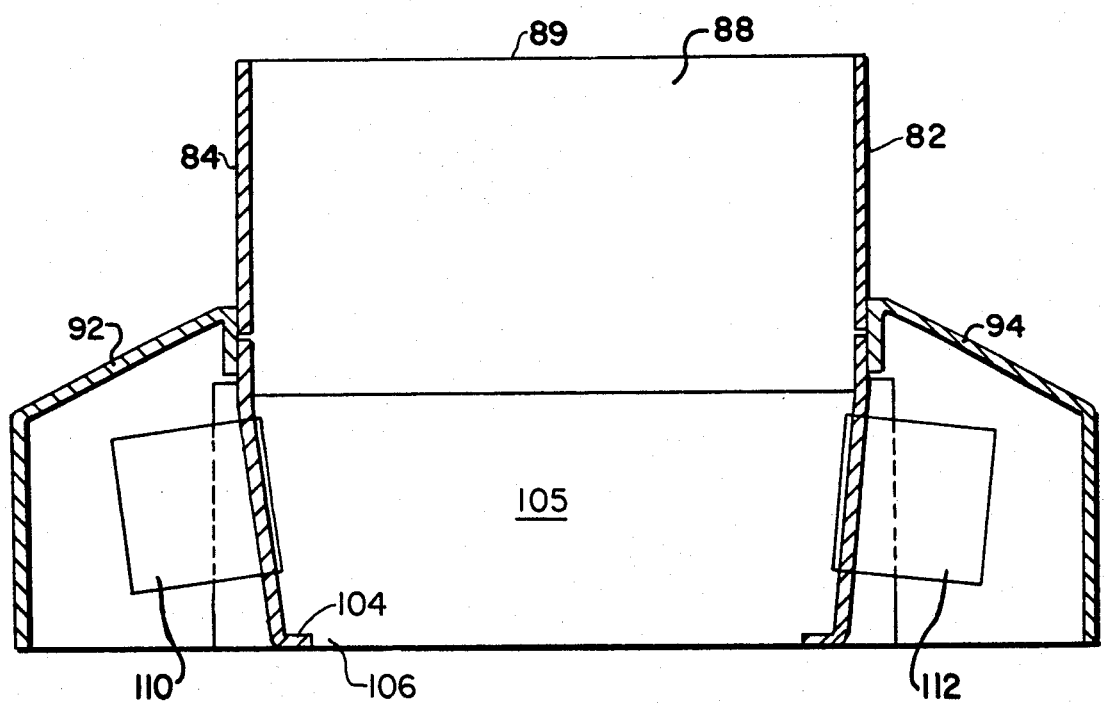
FIG. 5 is a cross-sectional view of the housing of FIG. 4 taken through 5—5.

Referring to FIGS. 1 through 3, access to the interior of cells 24, 26, 28 will be considered. A series of openings disposed generally at the same longitudinal position on the metal deck 2 is provided. These openings should be sufficiently large to permit ready insertion of a tool or hand in order to enable gripping the electrical wire for partial withdrawal from the cell in effecting desired connections. In the form shown, ribs 10 and 14 are provided with side wall openings 62, 64, respectively, in walls 40, 56 so as to provide openings generally facing third rib 12. Also, top wall 44 of rib 12 is provided with openings 66 in order to provide access to the wire or wires which it contains.

As is shown in FIG. 1, housing 80 is adapted to be partially received within the recess defined between ribs 10 and 14 and be disposed overlying rib 12 at the location of openings 62, 64, 66.

Referring to FIGS. 1 and 4-6, the details of a type of housing which may be employed in the present invention will be considered. The housing 80 has a pair of side walls 88, 90 and a pair of end wall 82, 84. The side wall 88 (FIG. 5) has an opening 105 which permits communication between the side wall chamber (defined by walls 82, 88, 84, 90) and cell 24 through opening 62. A similar opening (not shown) is provided in wall 90 to permit communication with the interior of cell 28 through opening 64. The bottom wall 104 of the chamber has opening 106 to permit communication with cell 26 through openings 66. At its upper extremity, the housing chamber terminates in a mouth 89. End walls 82, 84 are provided with enlargements 94, 92, respectively, each of which contains a housing electrical receptacle 110, 122 which has its socket openings in communication with the interior of the housing.

Figure 6:
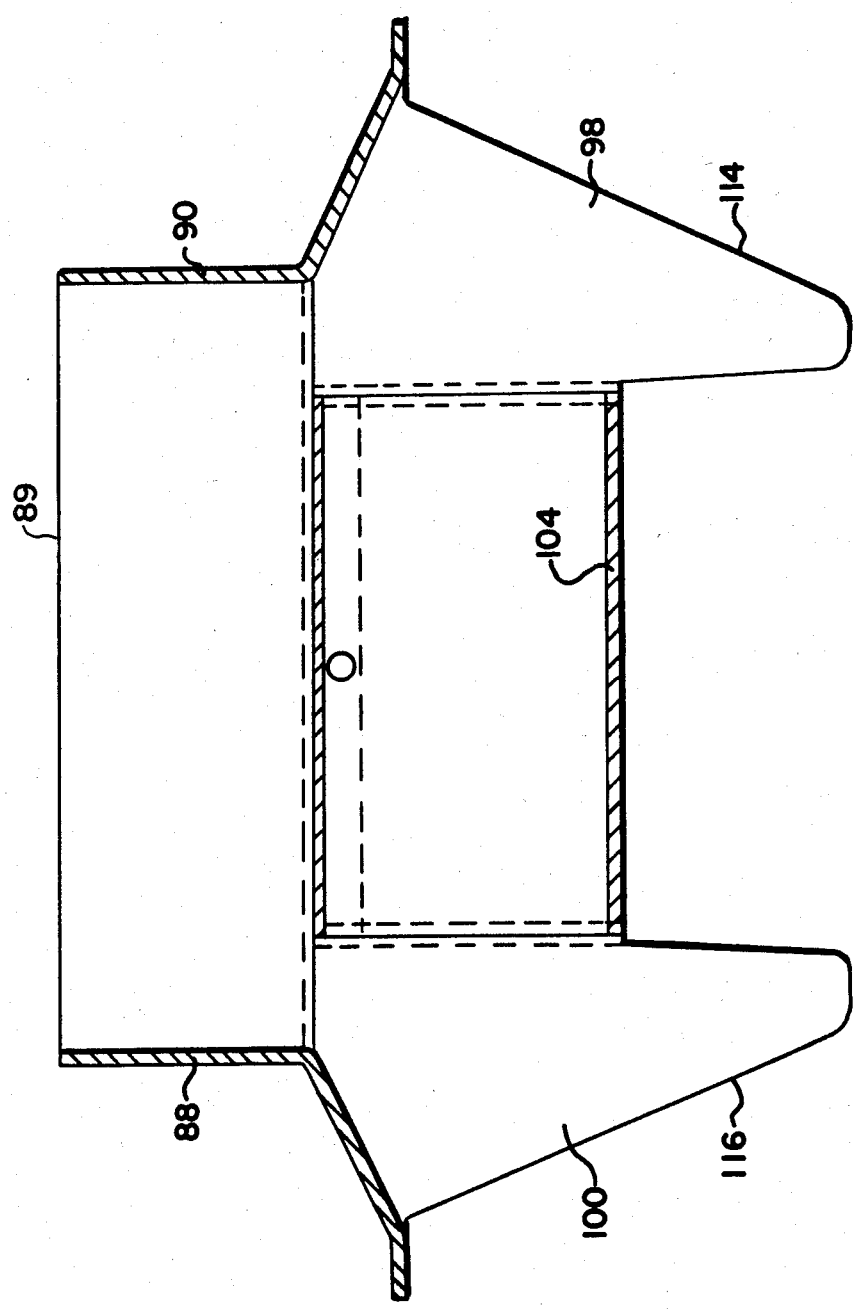
FIG. 6 is a cross-sectional view of the housing of FIG. 4 taken through 6—6.

As is shown in FIG. 6, the lower portions of side walls 88, 90 which have been identified generally by numbers 100, 98 are provided with side walls portions 114, 116 which slope generally upwardly and outwardly so as to complement the surfaces 40, 56 of ribs 10, 14 and be generally in surface-to-surface engagement therewith. A suitable cover plate member (not shown) such as that disclosed in copending application Ser. No. 316,682, now U.S. Pat. No. 4,454,692 may be provided if desired.

The housing 80 may be secured to the deck 2 by any suitable means such as rivets 102, for example.

While for clarity of illustration a certain specific form of cell defining rib and sheet has been shown, as have a particular form of housing, as will be appreciated from the following description, the invention is not so limited and may be employed advantageously in connection with a wide range of metal deck-concrete composite cellular floor systems having housings to facilitate access to electrical wires running through the cells.

For uses wherein one may employ the electrical outlets 110, 112 disposed within the housing 80 directly, wires from whatever electrical appliance is to be energized may be run through a cover chamber disposed generally at the mouth 89 of the housing 80 and the electrical plug inserted into a socket of housing receptacle 110 or 112. These receptacles may be of a conventional variety and each provide two sockets.

Figure 7:
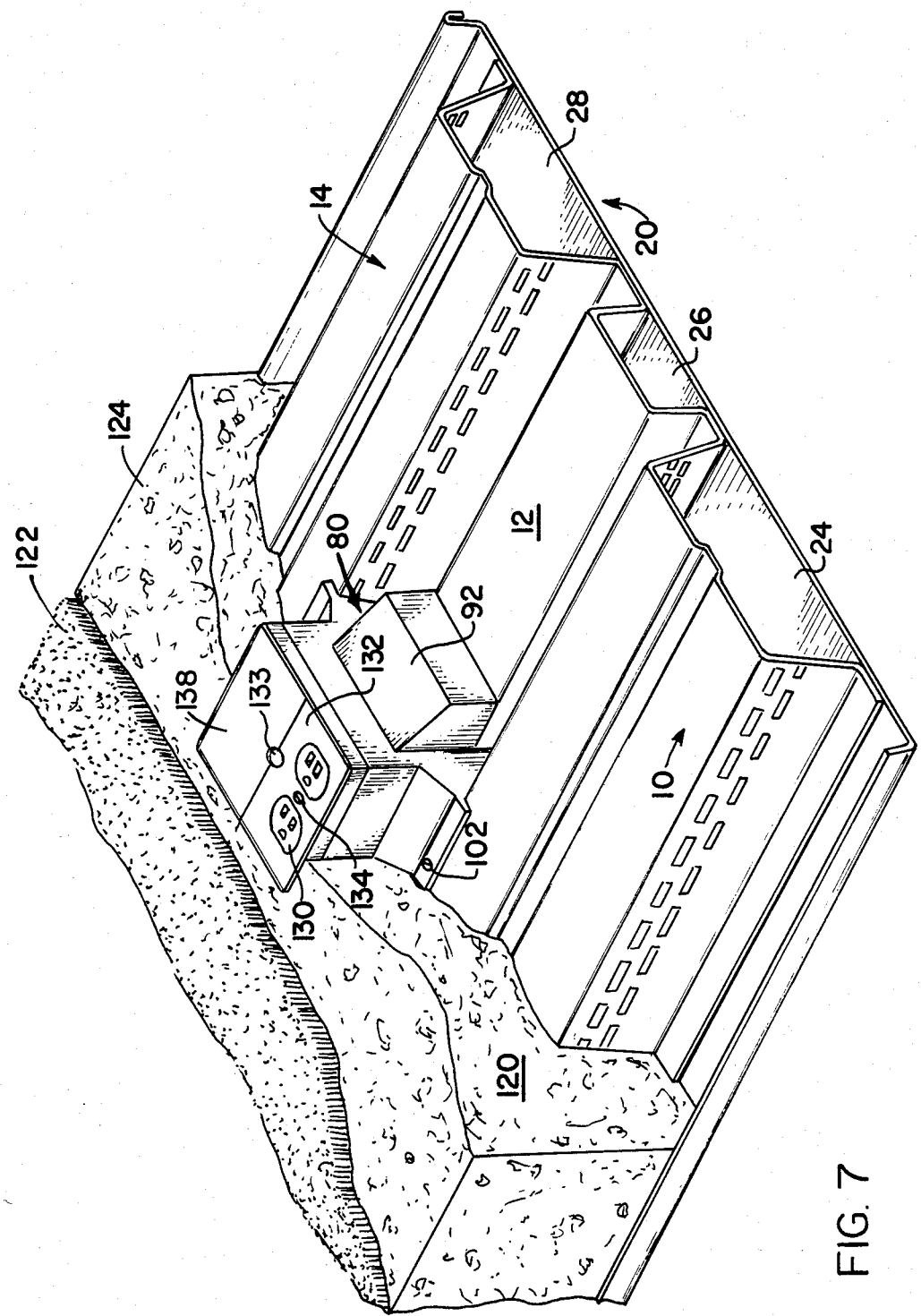
FIG. 7 is a partially broken away isometric view of one embodiment of the present invention.

Referring to FIG. 7, the housing 80 is shown positioned as also in FIG. 1. A layer of concrete 120 is shown in intimate in overlying relationship with respect to the deck and would, but for the breaking away for clarity of illustration, surround the housing 80 leaving the upper portion exposed. A carpet member 122 overlies the concrete 120. In this embodiment it is desired to position electrical outlets generally flush with the floor surface which for convenience of reference will be considered to be surface 124 of the concrete 120. In the form illustrated in FIGS. 7 and 8 a single remote electrical receptacle 130 is secured, respectively, to face plate 132 by any suitable means such as a screw. Face plate 138 is plain although a second receptacle could be provided, if desired. The face plates 132, 138 are generally coplanar and generally horizontally oriented such that the openings of the two sockets of receptacle 130 face generally upwardly. The face plates 132, 138 define an opening 133 through which an electrical wire 135 for a low tension connection is shown passing. If desired, the separate face plates 132, 138 which may function as a housing cover are illustrated in side-by-side adjacency may be formed as a unit. In FIG. 9 there is shown an electrical equipment plug 142 inserted into the receptacle 130.

Under prior systems installing remote receptacle 130 would have required fishing a wire out of the one of the cells 24, 26, 28 and wiring it to the receptacle 130. The present invention has obviated the need for such on the job labor while providing a modular concept which permits flexibility by providing ready positioning of the remote receptacle or receptacles at either of two positions illustrated or others as well as direct plugging into the receptacles disposed within the housing as described above. As is shown in FIGS. 10 and 11, the present invention the remote receptacle 130 is electrically connected by means of wire 154 to male plug member 156. By inserting the male plug 156 into any of the sockets of housing receptacles 110, 112 the sockets 130 are constantly energized without the need for customized wiring or special hardware. Further, it is noted that the sequence is readily reversed so that if the occupant of the space desires to change the electrical setup or a new occupant moves into the space the connection with the housing receptacles 110, 112 may readily be disconnected and a new arrangement provided.

In a preferred form, the wire 154 will be flexible and will be of sufficient length that the plug may be in a housing receptacle 110, 112 and yet permit the auxiliary electrical receptacle 130 to extend out of the housing beyond the mouth 89 thereof.

In a preferred embodiment the receptacle 130 and wire means 154 may be made unitary by molding a suitable insulating material over both the wire 154 and the enclosure 158 for the auxiliary receptacle 130. Among the suitable materials for this purpose are synthetic materials such as a thermoplastic resin. Among the preferred materials are thermoplastic carbonate-linked polymers (such that sold under the trade designation "LEXAN"), phenolformaldehyde resins (such as that sold under the trade designation "DUREZ"), furfuryl alcohol resins and polyester resins.

Figure 12:
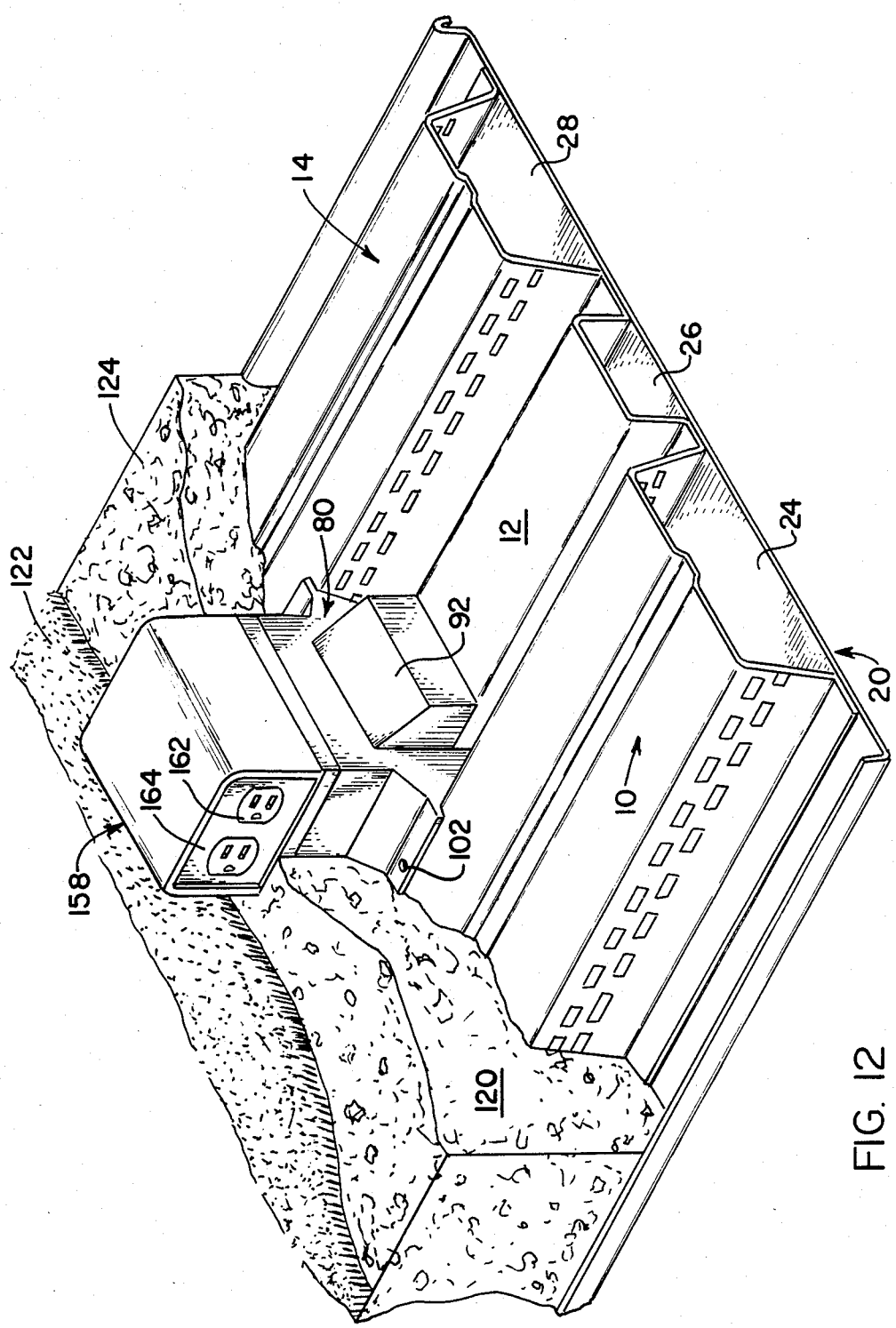
FIG. 12 is a broken away isometric view of another embodiment of the invention.

As is shown in FIGS. 11 and 12, the receptacle 130 has a pair of sockets 150, 152 and cover plate 132 has a peripheral upstanding wall 153 which defines an outwardly open recess. When the receptacles 150,152 are not in use suitable cover means may be inserted in the recess overlying the socket openings. The cover may consist of a plastic member generally coextensive with the recess.

Referring to FIG. 12, an embodiment of the invention wherein it is desired to employ a tombstone type remote receptacle arrangement will be considered. The general arrangement of the housing 80 and associated cell defining members is as was shown and described in FIG. 7. A tombstone 158, which is also shown in exploded view in FIG. 13, includes a generally channel shaped closure member 160 which cooperates with receptacle 162 and its associated face plate 164 and remote receptacle 166 and its associated face plate 168 to define an enclosure which overlies the housing chamber.

Figure 13:
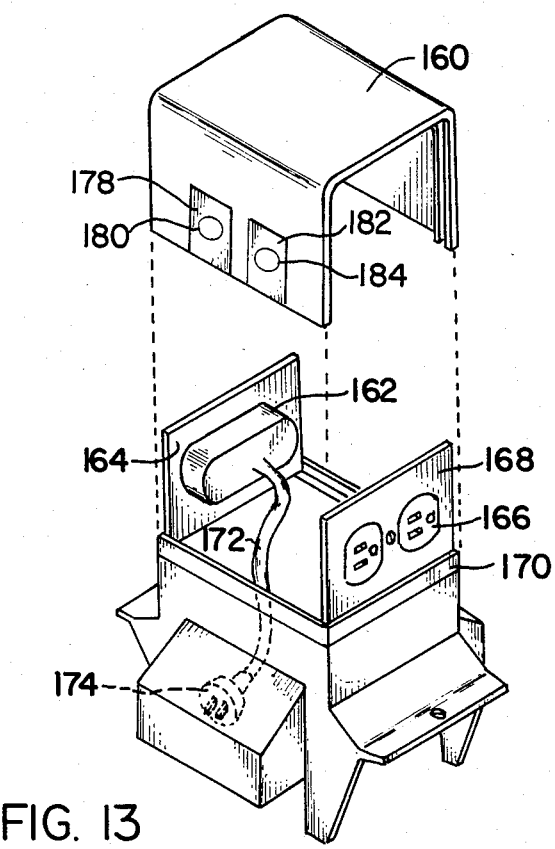
FIG. 13 is an exploded isometric view of the housing employed in FIG. 12.

As is shown in FIG. 13 the face plates 164, 168 are generally vertically oriented and in spaced parallel relationship with respect to each other. Their lower extremity is disposed within a rectangular frame member 170 which overlies the housing mouth.

Wire 172 terminates in plug 174 which is engaged within a socket of a housing receptacle.

Also shown in FIG. 13 is a pair of grommeted openings 180, 184 which in the form shown are provided in insert plates 178, 182. If desired, the openings may be provided directly in closure member 160. Wires, such as low tension wires, may pass through openings 180, 184. See wire 176 in FIG. 14. Also, if it is desired to employ only one remote receptacle a solid plate or plate with an opening such as 180 or 184 may be provided on one side.

Figure 14:
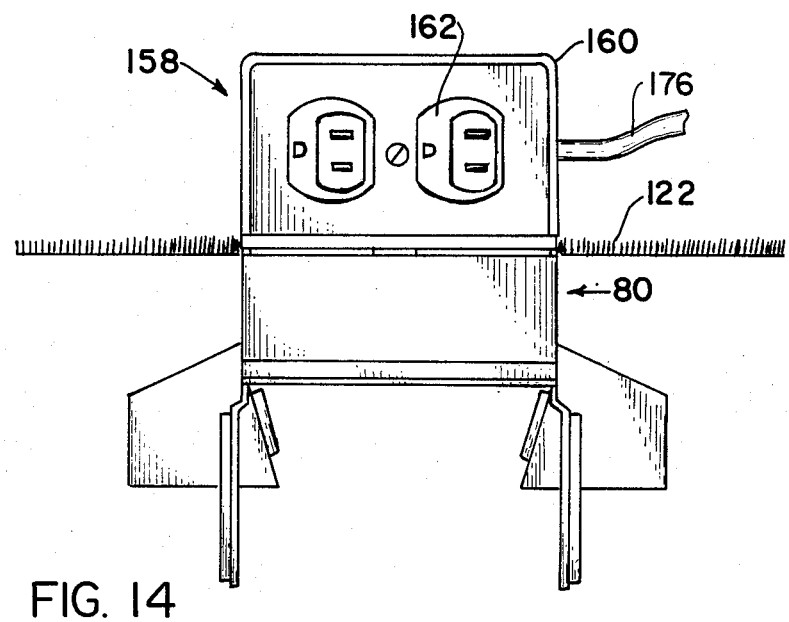
FIG. 14 is a partial elevational view of the housing shown in FIGS. 12 and 13.

In FIG. 14 there is shown the upward projection of the tombstone 158 above the floor level. As was true with the other embodiments, rather than requiring wiring directly with the wires in the cellular flooring or roofing, the wire means 172 is readily connected to the housing receptacle through plug 174 and may be removed should it be desired to alter the type of receptacle at that particular location. The electrical wire 172 has sufficient length to permit the plug 174 to be in the housing receptacle while permitting the remote receptacle 162 to be spaced above the housing mouth.

It will be appreciated, therefore, that by providing a housing having an internal electrical receptacle whether of the specific configuration and positioning shown and described herein or of any other type, one may permit ready, removable and economical provision of electrical appliance connection within the housing, at floor level or in an upwardly projecting tombstone device while providing only the face plate mounted receptacles with the associated electrical wire means and, in the case of a tombstone arrangement, the overlying closure member. This eliminates the need for additional parts and the need for extensive wiring and rewiring on the job during both initial installation and during subsequent changes.

Whereas particular embodiments of the invention have been described above for purposes of illustration, it will be appreciated by those skilled in the art that numerous variations of the details may be made without departing from the invention as described in the appended claims.

I claim:

1. A metal raceway structure adapted for use in concrete-metal composite construction comprising an elongated metal deck having alternating ribs and valleys, means underlying and cooperating with said metal deck to define a plurality of cells, said metal deck having first and second spaced ribs of generally equal height, a third rib interposed between the first and second ribs, said ribs having a top wall and depending side walls, said first and second ribs having side wall openings in side walls generally facing said third rib, housing means having at least a portion disposed in overlying relationship with respect to said third rib, said housing means having an interior chamber and a mouth disposed at the upper end of said housing, a first housing electrical receptacle disposed within said housing having socket means facing the interior of said housing means, said third rib having at least one top wall opening, at least one remote electrical receptacle disposed in generally overlying relationship with respect to said housing chamber, electrical wire means electrically connecting said first housing receptacle to said remote receptacle, said electrical wire means having a plug removably extending into said first housing receptacle, and said electrical wire means being of sufficient length to permit said remote electrical receptacle to extend upwardly beyond said housing mouth when said plug is engaged with said first housing receptacle, whereby said remote receptacle may have its sockets facing in a generally horizontal direction or in a generally vertical direction without loss of electrical continuity.

2. The metal raceway structure of claim 1 including said housing means having a longitudinally projecting extension, and said first housing receptacle being disposed with said extension.

3. The metal raceway structure of claim 2 including a second housing receptacle disposed within said said housing.

4. The metal raceway structure of claim 2 including said remote electrical receptacles each having a pair of electrical sockets.

5. The metal raceway structure of claim 4 including said remote electrical receptacle being secured to a face plate.

6. The metal raceway structure of claim 5 including a second remote electrical receptacle having a pair of electrical outlets and being secured to a face plate.

7. The metal raceway structure of claim 5 including said housing means having a second longitudinally projecting extension projecting in the opposite direction from said first extension, said second housing electrical receptacle disposed within said second extension and having socket means facing the interior of said housing means, and second wire means having plug means extending into said housing receptacle and being electrically connected to said second remote receptacle.

8. The metal raceway structure of claim 7 including each said remote receptacle being secured to a separate face plate.

9. The metal raceway structure of claim 7 including said remote receptacles being secured to the same face plate.

10. The metal raceway structure of claim 7 including said electrical sockets of said remote receptacle being generally upwardly open.

11. The metal raceway structure of claim 8 including said face plates providing a cover for said housing.

12. The metal raceway structure of claim 10 including said face plates being oriented generally horizontally in side-by-side adjacency.

13. The metal raceway structure of claim 12 including said electrical wire means having a flexible portion.

14. The metal raceway structure of claim 11 including said housing mouth being in underlying supporting relationship with respect to said face plates.

15. The metal raceway structure of claim 6 including said electrical wire means being of sufficient length to extend above said housing mouth when said wire means plug extends into a said second housing receptacle socket.

16. The metal raceway structure of claim 15 including said face plates being generally vertically oriented, and said first remote receptacle having its socket openings facing in a generally horizontal direction.

17. The metal raceway structure of claim 16 including cover means cooperating with said face plates to provide an enclosure overlying and in communication with said housing mouth.

18. The metal raceway structure of claim 17 including said face plates being disposed at a higher level than said housing mouth.

19. A utility access housing for securement to metal deck comprising a pair of spaced end walls, a pair of spaced side walls, said side walls having openings for passage of wire therethrough, a mouth disposed at the upper end of said housing, a first housing electrical receptacle disposed within said housing having a pair of electrical sockets in communication with said chamber, at least one remote electrical receptacle disposed in generally overlying relationship with respect to said housing chamber, electrical wire means having a plug member removably engaged with said first housing receptacle and being electrically connected to said remote electrical receptacle, and said electrical wire means being of sufficient length to permit said remote electrical receptacle to extend upwardly beyond said housing mouth when said plug is engaged with said first housing receptacle, whereby said remote receptacle may have its sockets facing in a generally horizontal direction or in a generally vertical direction without loss of electrical continuity.

20. The utility access housing of claim 19 including said housing having a pair of outwardly projecting extensions, and a second said housing electrical receptacle disposed within each said extension.

21. The utility access housing of claim 20 including a second said remote electrical receptacle, and second electrical wire means having a plug disposed in a said housing electrical receptacle and being electrically connected to said second remote electrical receptacle.

22. The utility access housing of claim 20 including each said remote electrical receptacle being secured to a face plate.

23. The utility access housing of claim 22 including said face plates being generally horizontally oriented in side-by-side adjacency.

24. The utility access housing of claim 22 including said face plates being oriented generally vertically in relative spaced relationship with the socket openings of one said remote receptacle facing a direction opposite from the socket openings of the other said auxiliary receptacle.

25. The utility access housing of claim 24 including closure means cooperating with said face plates to define an enclosure in communication with said housing chamber.

* * * * *

UNITED STATES PATENT AND TRADEMARK OFFICE
CERTIFICATE OF CORRECTION

PATENT NO. : 4,507,900

DATED : April 2, 1985

INVENTOR(S) : Donald H. Landis

It is certified that error appears in the above-identified patent and that said Letters Patent is hereby corrected as shown below:

Column 5, line 24, --and-- should be inserted after "cover".

Column 5, lines 41-42, "constantly" should read --instantly--.

Claim 3, line 2, "said" (2nd Occurrence) should be deleted.

Signed and Sealed this

Tenth Day of September 1985

[SEAL]

Attest:

DONALD J. QUIGG

Attesting Officer    Acting Commissioner of Patents and Trademarks - Designate